United States Patent
Larson et al.

(10) Patent No.: US 11,435,126 B2
(45) Date of Patent: Sep. 6, 2022

(54) ICEMAKER WITH THERMOFORMED ICE TRAY PROVIDING HEATING AND PHASE CHANGE SENSING

(71) Applicant: ILLINOIS TOOL WORKS INC., Glenview, IL (US)

(72) Inventors: Eric K. Larson, Cumberland, RI (US); William D. Chatelle, Cranston, RI (US); Juan J. Barrena, Johnston, RI (US)

(73) Assignee: Illinois Tool Works Inc., Glenview, IL (US)

( * ) Notice: Subject to any disclaimer, the term of this patent is extended or adjusted under 35 U.S.C. 154(b) by 109 days.

(21) Appl. No.: 16/545,843

(22) Filed: Aug. 20, 2019

(65) Prior Publication Data
US 2020/0064043 A1    Feb. 27, 2020

Related U.S. Application Data

(60) Provisional application No. 62/721,959, filed on Aug. 23, 2018.

(51) Int. Cl.
| | |
|---|---|
| F25C 1/243 | (2018.01) |
| F25C 5/08 | (2006.01) |
| G01N 27/22 | (2006.01) |
| F25C 1/18 | (2006.01) |
| H01C 17/075 | (2006.01) |

(52) U.S. Cl.
CPC ............ *F25C 1/243* (2013.01); *F25C 1/18* (2013.01); *F25C 5/08* (2013.01); *G01N 27/22* (2013.01); *H01C 17/075* (2013.01); *F25C 2600/04* (2013.01); *F25C 2700/14* (2013.01)

(58) Field of Classification Search
CPC .... F25C 1/243; F25C 5/08; F25C 1/18; F25C 2700/14; F25C 2600/04; F25C 5/06; F25C 2305/022; F25C 2700/02; F25C 2700/04; H01C 17/075; G01N 27/22; C09D 11/52
USPC .......................................................... 62/136
See application file for complete search history.

(56) References Cited

U.S. PATENT DOCUMENTS

| | | | | |
|---|---|---|---|---|
| 3,776,504 A | | 12/1973 | Wiley | |
| 4,870,538 A | * | 9/1989 | Baldwin | .............. H01G 4/1236 |
| | | | | 361/321.1 |
| 5,181,394 A | * | 1/1993 | Schea, III | ............... A61J 1/165 |
| | | | | D24/227 |

(Continued)

FOREIGN PATENT DOCUMENTS

| | | |
|---|---|---|
| DE | 102015016524 | 2/2017 |
| KR | 100845860 B1 | 7/2008 |
| WO | 9411170 A1 | 5/1994 |

OTHER PUBLICATIONS

International Search Report from ISA for PCT/US2019/047375; international filing date Aug. 21, 2019; dated Feb. 12, 2020; 9 pages.

(Continued)

*Primary Examiner* — Eric S Ruppert
*Assistant Examiner* — Kirstin U Oswald
(74) *Attorney, Agent, or Firm* — Boyle Fredrickson, S.C.

(57) ABSTRACT

An icemaker employs a thermoformed ice tray that may have preprinted conductors providing for heating elements in capacitive sensing. Capacitive sensing may be used to control a water fill level and/or to detect complete freezing of the ice cubes and/or to detect complete ejection of the ice cubes.

11 Claims, 14 Drawing Sheets

(56) References Cited

U.S. PATENT DOCUMENTS

| | | | | |
|---|---|---|---|---|
| 5,582,754 | A | * | 12/1996 | Smith ................ F25C 1/24 219/521 |
| 6,384,611 | B1 | * | 5/2002 | Wallace ............. B64D 15/20 324/699 |
| 10,126,037 | B2 | | 11/2018 | Barrena et al. |
| 2006/0201170 | A1 | * | 9/2006 | Cole .................... F25C 1/04 62/340 |
| 2009/0155557 | A1 | * | 6/2009 | DeVos ............... B32B 15/011 428/457 |
| 2009/0165492 | A1 | * | 7/2009 | Wilson ................ F25C 1/10 62/344 |
| 2012/0186288 | A1 | | 7/2012 | Hapke |
| 2012/0247130 | A1 | | 10/2012 | Ito et al. |
| 2017/0158898 | A1 | | 6/2017 | Xiao et al. |
| 2017/0211866 | A1 | * | 7/2017 | Woo .................... F25C 5/08 |
| 2017/0321943 | A1 | * | 11/2017 | Ji ........................ F25C 1/04 |
| 2017/0370628 | A1 | * | 12/2017 | Knatt .................. F25C 1/25 |
| 2018/0245833 | A1 | | 8/2018 | Brewer et al. |
| 2019/0041112 | A1 | | 2/2019 | Chatelle et al. |

OTHER PUBLICATIONS

Written Opinion from ISA for PCT/US2019/047375; international filing date Aug. 21, 2019; dated Feb. 12, 2020; 15 pages.
International Preliminary Report on Patentability for Application No. PCT/US2019/046617, International filing date Aug. 23, 2018, dated Feb. 23, 2021, 1 page.
Written Opinion for Application No. PCT/US2019/046617, International filing date Aug. 23, 2018, dated Feb. 23, 2021, 13 pages.

* cited by examiner

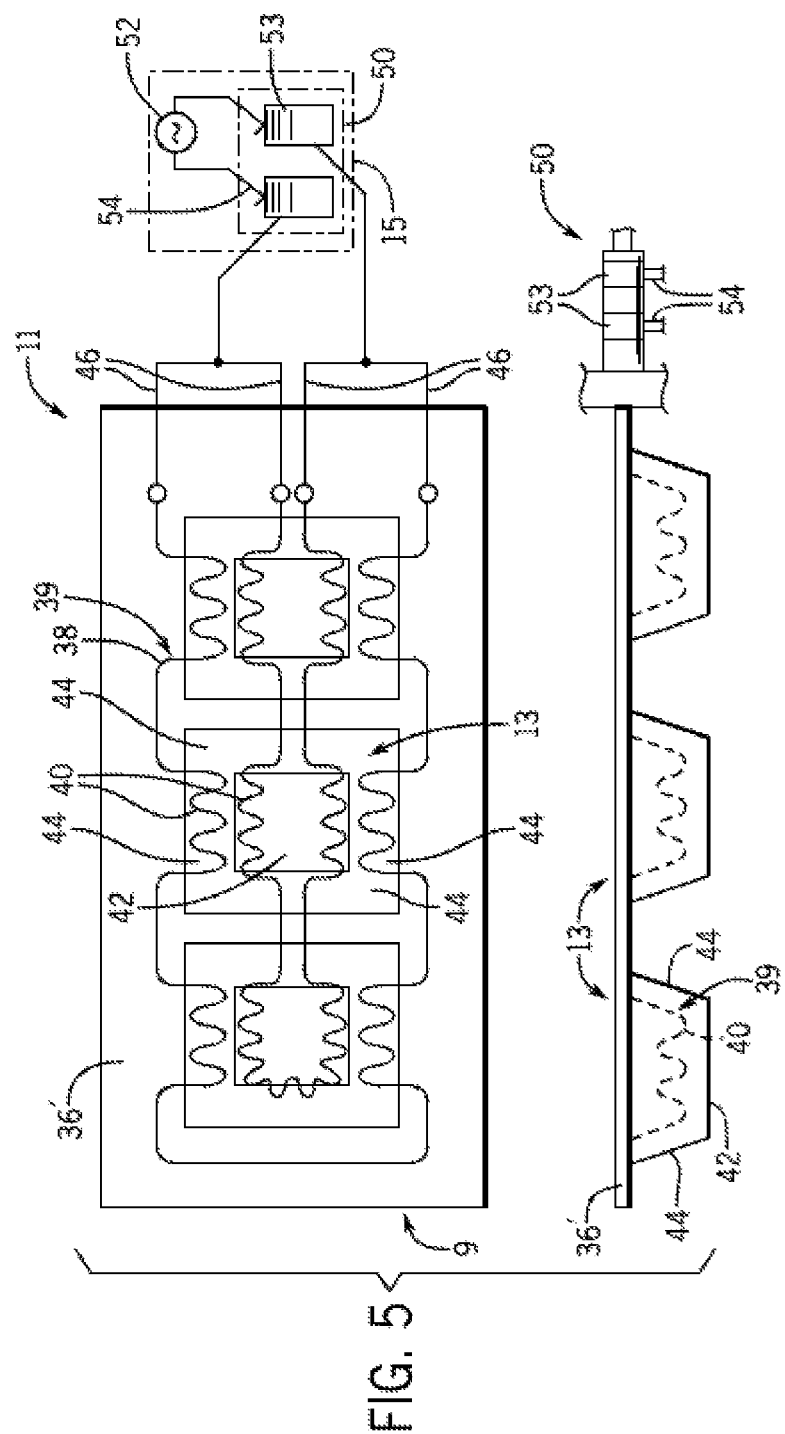

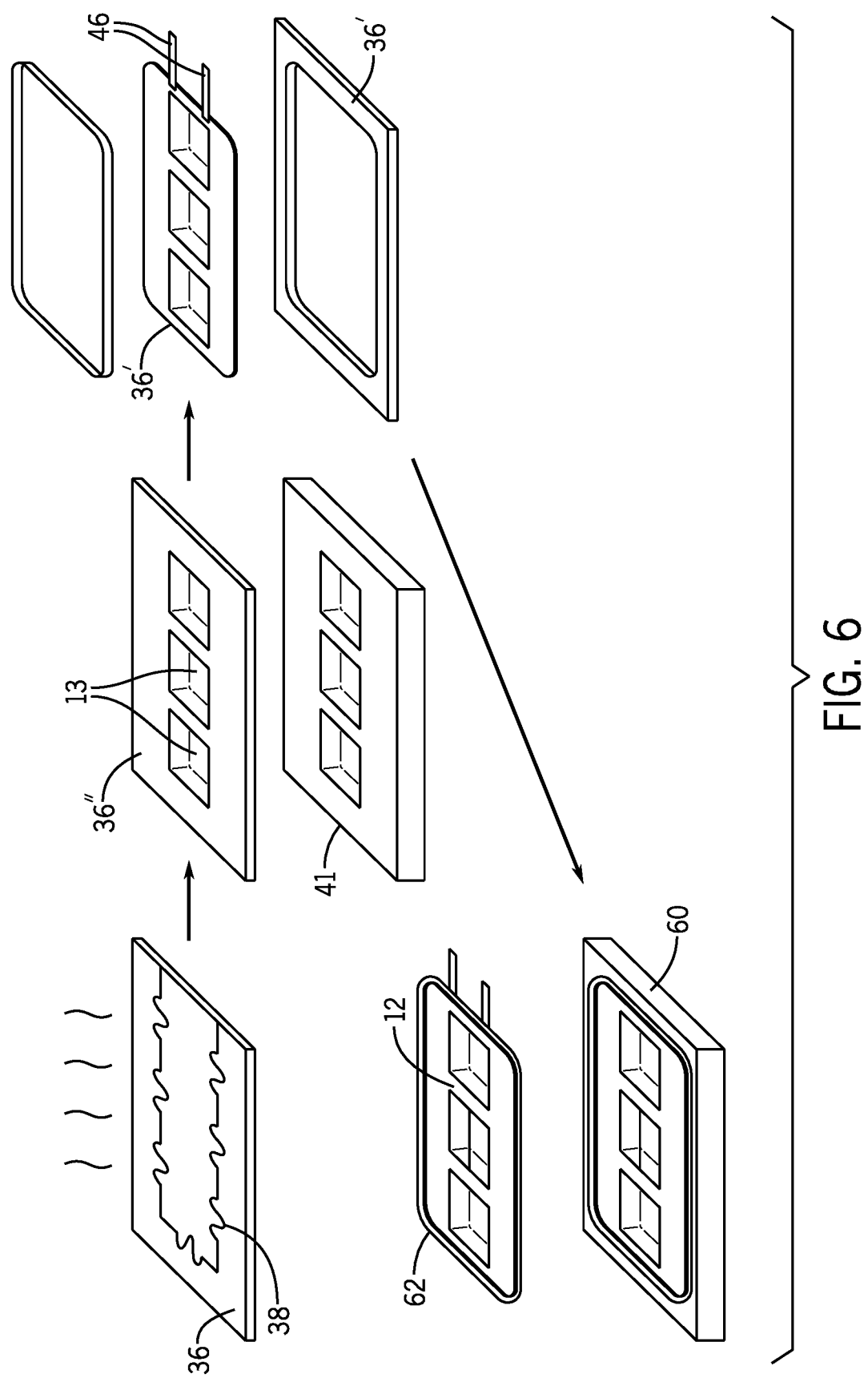

ICEMAKER WITH THERMOFORMED ICE TRAY PROVIDING HEATING AND PHASE CHANGE SENSING

CROSS-REFERENCE TO RELATED APPLICATIONS

This application claims the benefit of U.S. provisional application 62/721,959 filed Aug. 23, 2018 and is hereby incorporated by reference.

FIELD OF THE INVENTION

The present invention relates to icemaking machines for home refrigerators and the like and specifically an icemaker providing improved energy efficiency and high throughput icemaking.

BACKGROUND OF THE INVENTION

Household refrigerators commonly include automatic icemakers located in the freezer compartment of the refrigerator.

A typical icemaker provides an ice cube tray positioned to receive water from an electrically controlled valve that may open for a predetermined time to fill the tray. The water is allowed to cool until ice formation is ensured. At this point, the ice is harvested from the tray into an ice bin positioned beneath the ice tray, for example, by a twisting and inverting of the ice tray or by a heating of the ice tray and use of a comb that pushes the ice cubes out of the ice tray. The amount of ice in the ice tray may be determined with a bail arm which periodically lowers into the ice tray to check the ice level. If the bail arm is blocked in its descent by a high level of ice, this blockage is detected and ice production is stopped.

In systems where the tray is heated for ice removal, the tray may be fabricated, for example, of a highly conductive material such as aluminum and a central calorie rod ("cal-rod") heater may be attached to the tray, for example, along its centerline to heat the tray. Such systems are effective in releasing ice but can use substantial electrical power in excess of 100 watts.

In systems where the ice tray is twisted and inverted for ice removal, the ice tray may be constructed of a robust injection molded plastic material or the like that can resist substantial cycling and distortion.

SUMMARY OF THE INVENTION

The present invention provides an extremely light weight ice tray that can be fabricated by thermoforming, a process in which a planar, thin sheet of thermoplastic material is heated to a pliable state and then formed by being drawn into a mold using vacuum or plugs corresponding to the mold recesses. The resulting ice tray allows improved ice ejection with no or very slight mechanical distortion. In various embodiments, the thermoformed ice tray offers an improved substrate for the printing of electrical heaters or sensing elements, the former assisting in ice release and the latter providing water height sensing, ice release sensing, and phase change sensing.

In one embodiment, the invention includes a method of fabricating an ice tray for an icemaking machine providing multiple pockets for molding water into ice cubes. The method involves: (a) heating a substantially planar sheet of thermoplastic to a pliable forming temperature; (b) forming the planar sheet into an ice tray by drawing the thermoplastic into multiple recesses in a mold each forming a pocket; and (c) attaching the formed ice tray to a motor driven shaft of an icemaking machine positioning the mold in a first upright position for filling the pockets with water and a second inverted position for ejecting frozen water from the pockets.

It is thus a feature of at least one embodiment of the invention to provide a highly flexible and lightweight ice tray for improved ice release.

The method may provide a supporting frame having a first axle communicating with a proximal end of the ice tray to rotate the same about a rotational axis and to warp the ice tray as it is inverted.

It is thus a feature of at least one embodiment of the invention to assist in ice release through slight longitudinal, mechanical warpage of the ice tray readily accommodated by the thin thermoformed material.

The ice tray may communicate at a distal end with a cam rotating about the rotational axis when the ice tray is facing upward to receive water within the pockets and rising off the rotational axis when the ice tray is facing downward to flex the ice tray to release ice.

It is thus a feature of at least one embodiment of the invention to provide a simple mechanism for mechanical warpage of the ice tray using the power available for ice tray rotation.

The frame may include a catch contacting the ice tray in between the distal and proximal ends of the ice tray to bow the ice tray concavely upward.

It is thus a feature of at least one embodiment of the invention to promote a more uniform flexure of the ice tray which releases ice equally from multiple pockets.

The method may provide a motor for rotating the first axle wherein the motor has a low wattage, for example, a wattage of less than 10 watts.

It is thus a feature of at least one embodiment of the invention to provide a readily flexed ice tray reducing power requirements and energy usage by the ejection mechanism motor.

The motor may be a stepping motor.

It is thus a feature of at least one embodiment of the invention to permit the use of a low torque stepper motor permitting simplified control of ice tray motion through step counting and step-rate control without a need for position sensors.

The method may further include trimming the planar sheet after forming to provide a trimmed edge and insert-molding thermoplastic material over the trimmed edge to provide an injection molded rim covering the trimmed edge.

It is thus a feature of at least one embodiment of the invention to permit the use of a thin ice tray material for improved cooling, reduced heat absorption, and improved flexibility, while providing resistance to edge tearing and controlling flexibility.

The method may further include printing electrical conductors on the planar sheet of thermoplastic prior to thermoforming.

It is thus a feature of at least one embodiment of the invention to provide an improved manufacturing technique for including electrical conductors within an ice tray.

The printing may print on an upper surface of the thermoplastic sheet adjacent to water when the ice tray is filled.

It is thus a feature of at least one embodiment of the invention to provide close proximity between the conductors and the ice both for sensing purposes (sensing water fill, freezing, and ice ejection) and for improved heating, the latter requiring lower wattage heating output because of the reduced thermal insulation between the heater and the tray.

The pockets may have a bottom wall surrounded by upstanding sidewalls and the printing may print a serpentine heating pattern on an upper surface of the bottom wall and/or at least one sidewall.

It is thus a feature of at least one embodiment of the invention to provide a fabrication method that places heating conductors on any of a variety of different surfaces having different orientations by pre-printing on a flat surface and then forming that surface into the desired shape. It is another feature of at least one embodiment of the invention to permit heating on multiple of the surfaces including all of the surfaces of the ice tray pockets for improved ice release.

The method may further make use of an electrical source connected to the heating pattern for applying less than 10 watts to the heating pattern.

It is thus a feature of at least one embodiment of the invention to permit extremely low wattage heating compatible with printed wiring assisted by the low thermal mass of the ice tray and the close proximity of the conductors to the ice in contrast to cal-rod systems.

In addition or alternatively, the method may provide a printing of at least two electrically isolated (direct current isolated) electrodes in at least one ice tray pocket for capacitive sensing of material within the pocket.

It is thus a feature of at least one embodiment of the invention to provide for the construction of capacitive sensing electrodes for a variety of purposes including water fill level determination, ice freezing determination, and ice ejection determination.

The method may further include attaching solid metal conductors (wire or metal strips) to the printed conductors, the metal conductors communicating from the ice tray to electrical circuitry of the icemaker. This attachment may be by mechanical staking.

It is thus a feature of at least one embodiment of the invention to provide a method of connecting printed wiring on an ice tray to corresponding circuitry using the printed wiring for heating or sensing purposes.

Additionally or alternatively, the invention may provide an icemaking apparatus with an ice tray having multiple pockets for molding water into ice cubes and a first and second electrode positioned adjacent to at least one pocket for measuring a capacitance between the electrodes as influenced by a dielectric of material held within the pocket. An ejector communicates with the ice trays to eject ice from the pockets after water in the pockets freezes into ice cubes and a controller communicates with the first and second electrodes and the ejector to operate: (a) in a first state to allow filling of the multiple pockets of the ice tray with water; (b) in a second state, after completion of the first state, to monitor the first and second electrodes to detect a capacitance associated with phase change of the water to ice; and (c) based on detection of the capacitance associated with the phase change of water to ice, to activate the ejector to eject the ice cubes.

It is thus a feature of at least one embodiment of the invention to provide for sensing of complete freezing of ice cubes to provide for higher throughput in which ice is ejected immediately or closer to the time that it freezes.

The ejector may include a heater positioned adjacent to at least one pocket and the controller may further operate to: activate the heater of the ejector to eject ice cubes; monitor the first and second electrodes to detect a capacitance associated with ejected ice from the pockets; and in response to the detection of ejected ice, deactivate the heater.

It is thus a feature of at least one embodiment of the invention to provide a detection of ice ejection allowing the heater operation to be terminated as soon as possible, thereby reducing energy consumption by the heater and unnecessary heating of the refrigerator compartment.

The apparatus may further include a valve controlling the flow of water into the pockets and the controller may communicate with the first and second electrode and the ejector to: open the valve to begin filling the pockets; monitor the first and second electrodes to detect a capacitance associated with a complete filling of the pockets; and based on detection of the capacitance associated with a complete filling of the pockets, close the valve.

It is thus a feature of at least one embodiment of the invention to provide for a control of water level by capacitive sensing using in-pocket sensing elements that can also be used for other purposes including phase change sensing and ejection sensing.

Additionally or alternatively, the invention may provide an ice making apparatus that improves ice clarity by heating the ice mold holding the water during the freezing process. This may be done by activating the heater elements normally used to eject the ice. A controller communicates with the heater elements and operates in multiple states. In a filling state, a valve is controlled to deliver water into ice tray pockets. In a clarity state, the heater elements are activated before the water completely freezes in the pockets to reduce cloudiness in the freezing ice from gas bubbles.

It is thus a feature of at least one embodiment of the invention to provide a simple method of improving ice clarity without the need for continuous agitation.

Other features and advantages of the invention will become apparent to those skilled in the art upon review of the following detailed description, claims and drawings in which like numerals are used to designate like features.

BRIEF DESCRIPTION OF THE DRAWINGS

FIG. 5 is a top plan view of the blank of FIG. 4 and aligned side view of that blank after thermoforming showing the formation of the pockets and attachment of conductors for communication with slip rings;

FIG. 6 is a process flow chart showing the process of thermoforming and printing for producing the ice tray of FIG. 4 including an optional trimming step and over molding step;

Figure 1:
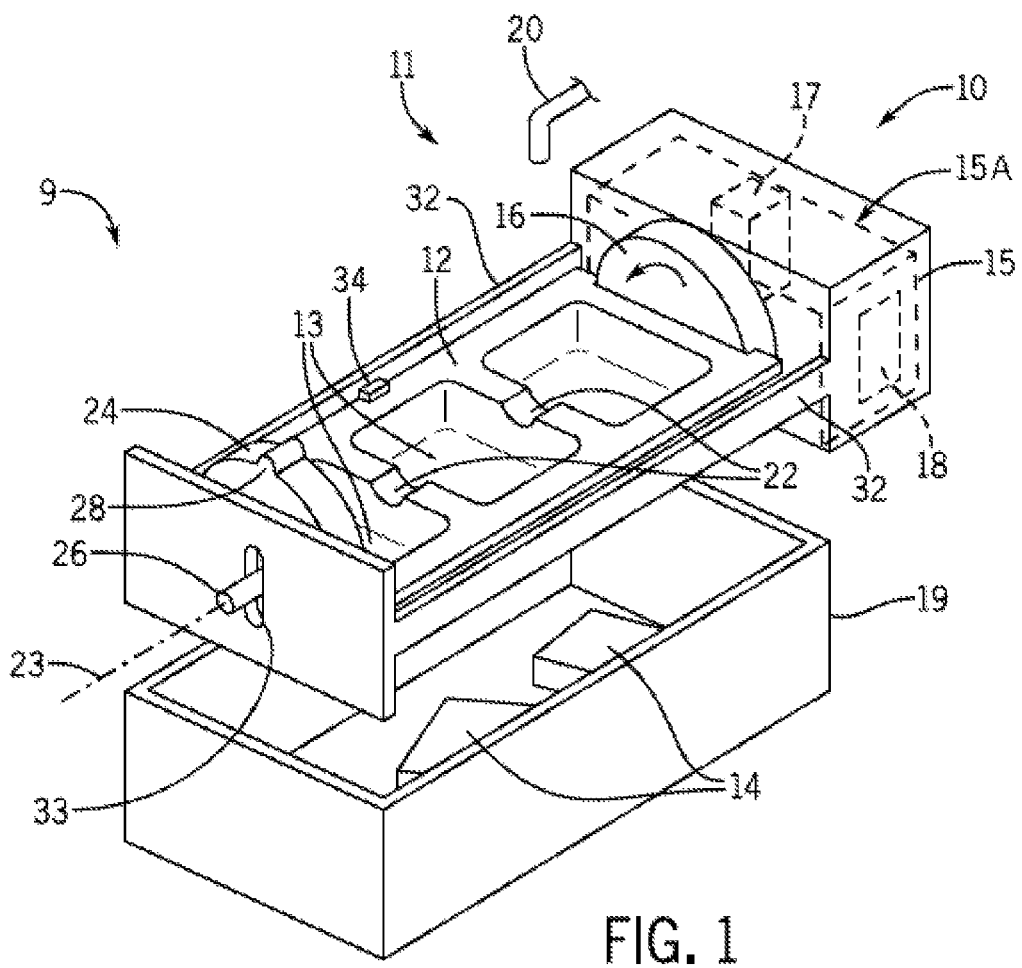
FIG. 1 is a perspective view of an icemaking machine providing an ice tray rotatable by a motor unit for discharging ice cubes into a receiving bin and showing a cam attached to one end of the ice tray for flexing the ice tray during ice discharge.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to FIG. 1, an icemaker 10 may include an ice tray 12 having multiple pockets 13 for receiving water and molding the water into frozen ice cubes 14 of arbitrary shape defined by the pockets 13. The ice tray 12 may be positioned adjacent to a drive housing 15 that houses various components of an ejector 15A that communicates with the ice tray 12 to eject from the pockets 13 after water in the pockets freezes into ice cubes. The ejector 15A may include a rotatable drive 16 that is exposed from the drive housing 15 and is connected to a proximal end 11 of the ice tray 12.

The distal end 9 of the rotatable drive 16 communicates within the drive housing 15 with an electric motor 17 for rotating the ice tray 12 between a first position (as shown in FIG. 1) allowing the ice tray 12 to be filled with water and a second position (not shown) rotated 180 degrees about a rotation axis 23 of the rotatable drive 16 so that the ice tray 12 is inverted to discharge ice cubes into a lower collection bin 19. The ice tray 12 as shown provides for three pockets 13 communicating by inter-pocket channels 22 allowing the equalization of water level within each pocket if desired. The invention contemplates additional pockets 13 as desired.

The motor may be a DC permanent magnet motor, a stepper motor, or other electrical motor well known in the art. The low ejection force for ejecting ice as is required by the icemaker 10 allows the use of low-power versions of such motors, for example, consuming less than 10 watts. The use of the stepper motor made possible with this design allows simplified control of the ice tray position through step counting and/or velocity through step rate control, for example, by a microcontroller using well-known techniques, possibly eliminating the need for limit switches or other sensors for monitoring ice tray position.

The motor 17 will be controlled by a controller 18, for example, including a microcontroller and associated circuitry as will be discussed below. The controller 18 may further communicate with a valve (not shown) controlling water through a nozzle 20 for use in filling the ice tray 12 when the ice tray 12 is in the upright position as depicted.

Although not shown in FIG. 1, the invention contemplates additional structure that may be included in the icemaker 10, for example, including a bail arm to check for ice level according to methods well known in the art, for example, as described in U.S. patent application Ser. No. 13/288,443, entitled "Ice-Harvest Drive Mechanism with Dual Position Bail Arm," which is assigned to the assignee of the present invention and hereby incorporated in its entirety by reference.

Figure 2:
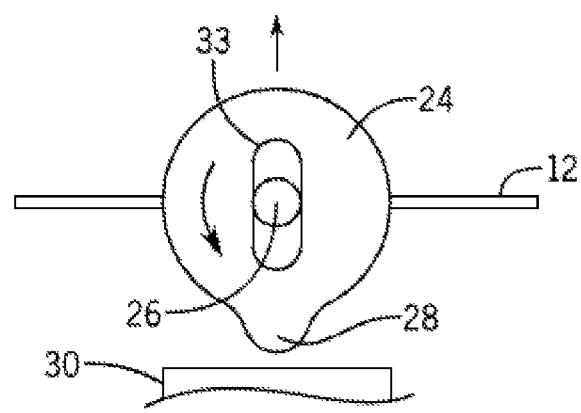
FIG. 2 is an elevational view of the cam of FIG. 1 in its elevated or flexing position.

Referring now also to FIG. 2, a distal end of the ice tray 12 connects to a cam disk 24 being a generally circular disk radially symmetric about an axle 26 but having a high radius portion 28 extending outward from the circle positioned at an upper periphery of the cam disk 24 when the ice tray 12 is in the upright position as shown in FIG. 1. When the ice tray 12 is in an inverted ejecting position, as shown in FIG. 2, the high radius portion 28 engages with a stop element 30 being part of a frame 32 stationary with respect to the housing 15.

Figure 3:
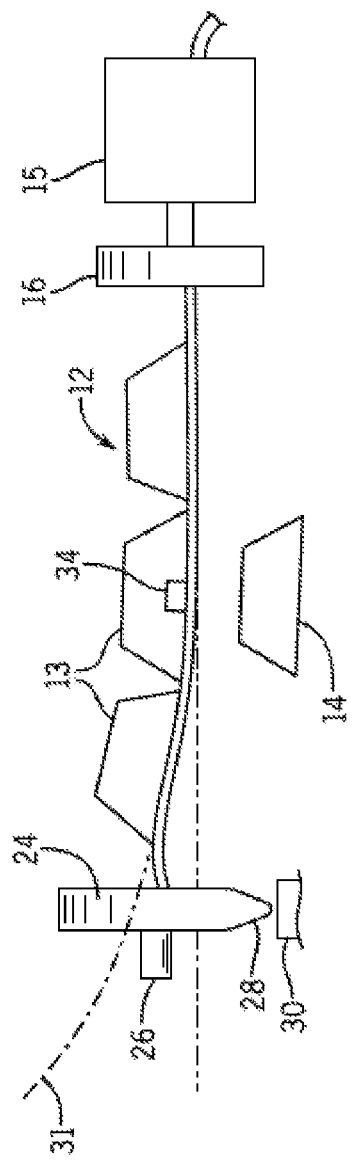
FIG. 3 is a side elevational view of the tray of FIG. 1 and cam of FIG. 2 showing the flexing caused by the camming action in the elevated cam position as enforced by a stationary catch bending the tray.

Referring now to FIG. 3, this engagement between the high radius portion 28 and the stop element 30 lifts the axle 26 within a slotted journal 33 causing a bowing of the ice tray 12 along curvature line 31 being generally upwardly concave such as promotes ejection of the ice cubes 14 from the pockets 13. This bowing may be facilitated by a stationary catch 34 positioned on the frame 32 and extending inward toward the rotation axis 23 and acting to hold down a middle of the ice tray 12 when the ice tray 12 is in the inverted position.

As will be discussed in more detail below, the ice tray 12, including the pockets 13, may be fabricated by thermoforming the ice tray 12 from a thin polymer material, for example, the thin polymer material having a thickness of less than 20 mils (0.020 inches) or typically less than 0.40 inches providing substantial flexibility in the pockets 13. This flexibility of this thin material is believed to permit improved ejection of the ice cubes 14 with very little mechanical distortion providing a long life to the thin material. As shown, the pockets 13 may have large mold release angles to facilitate release of the cubes 14.

Figure 4:
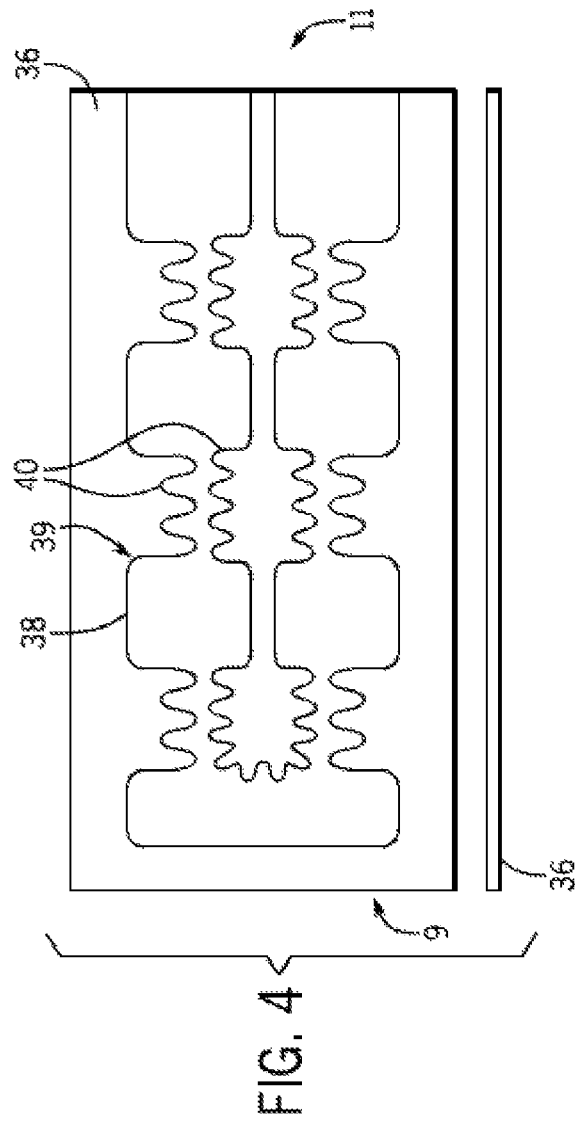
FIG. 4 is a top plan view of a thermoformed blank and aligned side view of the blank with a pre-printed heater pattern.

Referring now also to FIGS. 1, 6 and 4, in one embodiment, the thermoformed ice tray 12 may be thermoformed from a thin flexible blank 36 of a thermoplastic material such as Lexan 8040, a polycarbonate thermoplastic commercially available from SABIC of Saudi Arabia with functionally similar materials being widely available commercially. A thickness of the blank 36 will typically be less than 0.060 inches and preferably less than 0.040 inches or substantially 0.02 inches in thickness.

An upper surface of the blank 36 may be printed with a conductor pattern 38 in the planar state to facilitate the printing process, for example, using silkscreen or the like. The conductor pattern 38 may be from a conductive polymer-based thick film ink, for example, using a silver conductor within a polymer carrier that can be stretched in postprocessing. A suitable ink is available from the DuPont company under the tradename DuPont 5025. The conductor pattern 38 will normally be printed on the bottom side of the tray (the surface opposite the water) to prevent direct electrical contact between that pattern and water in the ice tray 12.

Once the ink has cured, the blank 36 may be thermoformed by heating it to a pliable state and forming the pockets 13 in the blank 36 to produce a form blank 36'. The pockets 13 may be formed using a mold 41 (having recesses defining the exterior of the pockets) and drawing the blank 36 into the mold recesses using a vacuum (air pressure) and/or physical plugs (not shown) mating with the recesses according to well known thermoforming techniques.

Referring specifically to FIGS. 4 and 5, in one embodiment, the conductor pattern 38 may provide for an ejector heater 39 having serpentine heater elements 40 that will ultimately be positioned on a rectangular bottom surface 42 and each of four upstanding sidewalls 44 extending upwardly from the bottom surface 42 of each pocket 13. For this purpose, the patterns for the heater elements 40 may be pre-distorted to have the proper shape after thermoforming. As shown the heating elements 40 may be interconnected in electrical series and in parallel electrical circuits as desired to control the desired currents and heating of each heater element 40.

As shown in FIG. 6, after thermoforming, the blank 36 may be trimmed, for example, by a die cutter to a desired outside dimension. Referring also to FIG. 5, at this time secondary conductors 46 may be attached to the printed conductor pattern 38, the latter terminating at a proximal end 11, for example, through a conductive adhesive or mechanical staking process using conductive rivets or the like. The conductors 46 may be solid metal strips or solid single or multi-strand conductive wire (as opposed to the particulate silver of the ink) with an outer insulating material as is generally understood in the art.

The conductors 46 may connect the printed conductor pattern 38 to a slip ring assembly 50 allowing the latter to communicate with a voltage source 52 within the housing 15 as will be discussed below. Generally, the voltage source 52 will apply a current to the heater elements 40 so that the power consumption of the heaters is less than 10 watts. Slip ring systems suitable for this purpose are described in U.S. patent application Ser. No. 14/438,231, entitled "Ice-Maker Motor with Integrated Encoder and Header," hereby incorporated in its entirety by reference and in particular with respect to the discussion of FIGS. 12-14 and generally including a circular or cylindrical conductor ring 53 communicating with brushes 54 that slide along its surface.

Referring to FIG. 6, the thermoformed ice tray 12 may optionally be placed in an injection molding mold 60 (only one half shown for clarity) to insert-mold rim 62 over the cut edge of the form blank 36 after the die cut trimming to provide improved finish and resistance to tearing as well as better control of flexure.

Figure 7:
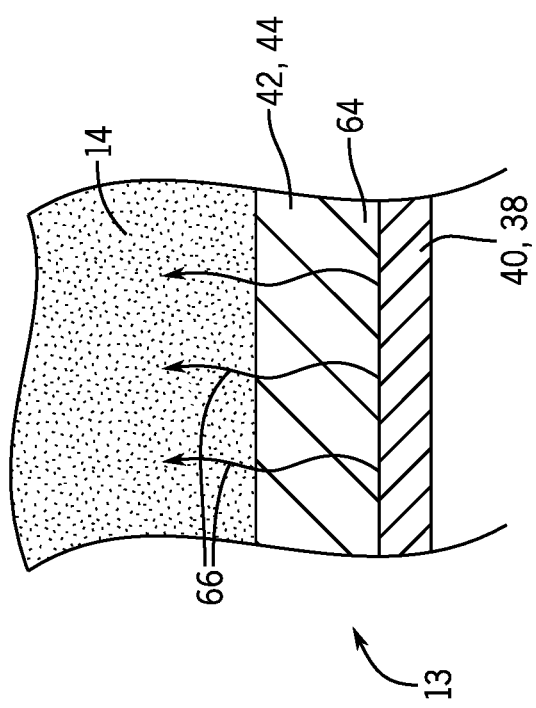
FIG. 7 is a fragmentary cross-section through a wall of one of the ice pockets showing the low thermal mass of the ice tray and surface heating by surface printed heaters such as promotes heat flow directly into the ice cube/tray interface.

Referring now to FIG. 7, it will be appreciated that the extremely thin thermoformed material 64 of the bottom surface 42 and sidewalls 44 of the pockets 13 provide reduced thermal mass such as may absorb heat from the heater elements 40, in this way allowing most of the heat energy from the heater elements 40 to pass, as indicated by arrow 66, into the ice cubes 14 for surface heating to release the ice cubes 14 from the pockets 13. This heating effect is amplified by the fact that the heating elements 40 are on the inner surface of the pockets 13 which are adjacent to the ice cubes 14 separated only by a thin electrical insulating layer of less than 0.10 inches. Thus that heat is not insulated from the ice cubes 14 by the thermoformed material 64.

Figure 8:
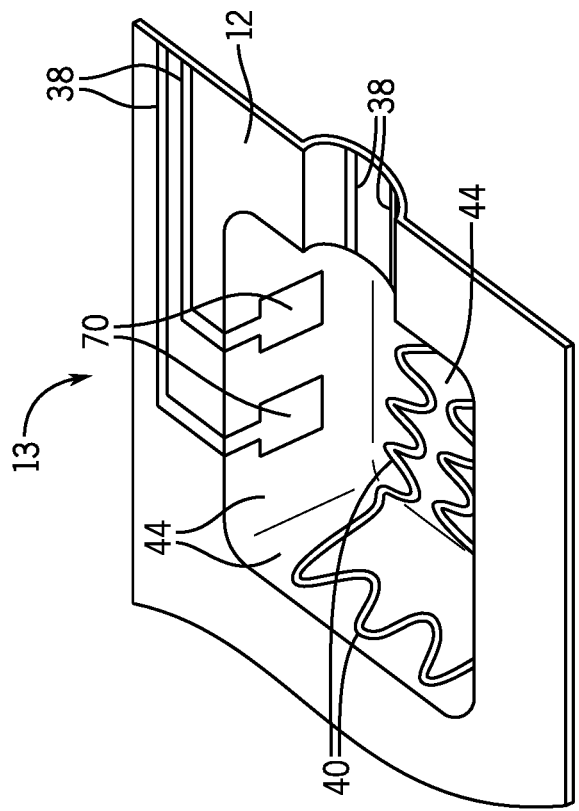
FIG. 8 is a fragmentary perspective view of a thermoformed pocket showing both heater elements and a sidewall capacitive sensor.

Referring now to FIG. 8, in one embodiment one or all of the heating elements 40 may be replaced by capacitive sensing electrodes 70 providing two electrodes adjacent to the volume of the pockets 13 and within the pockets 13 electrically isolated except through electrostatic coupling through a dielectric from any material within the volume of the pockets 13. As such, the capacitance between the sensing electrodes 70 varies according to the dielectric or bulk dielectric of the material in the pocket 13. The sensing electrodes 70 are provided by conductive patterns 38 (of material similar to or identical with the conductive patterns used for the heater elements 40) with conductors 46 (not shown) that may also pass through slip rings 50 to communicate with circuitry within the housing 15.

Figure 9:
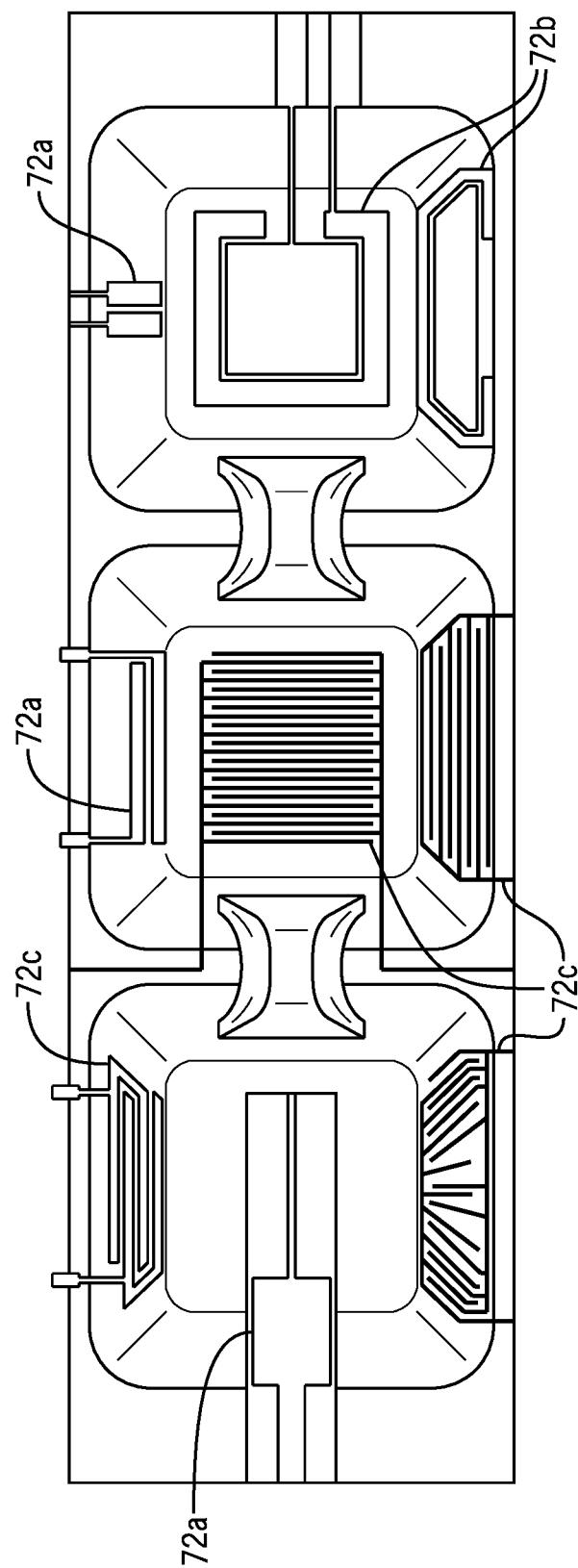
FIG. 9 is a top plan view of the pockets of the ice tray FIG. 1 showing multiple options for capacitive sensor locations and styles.

Referring now to FIG. 9, the sensing electrodes 70 may provide for a variety of forms including form 72a providing adjacent parallel conductive bands, form 72b providing a center electrode and a surrounding second electrode, or form 72c providing interdigitated parallel fingers.

Figure 10:
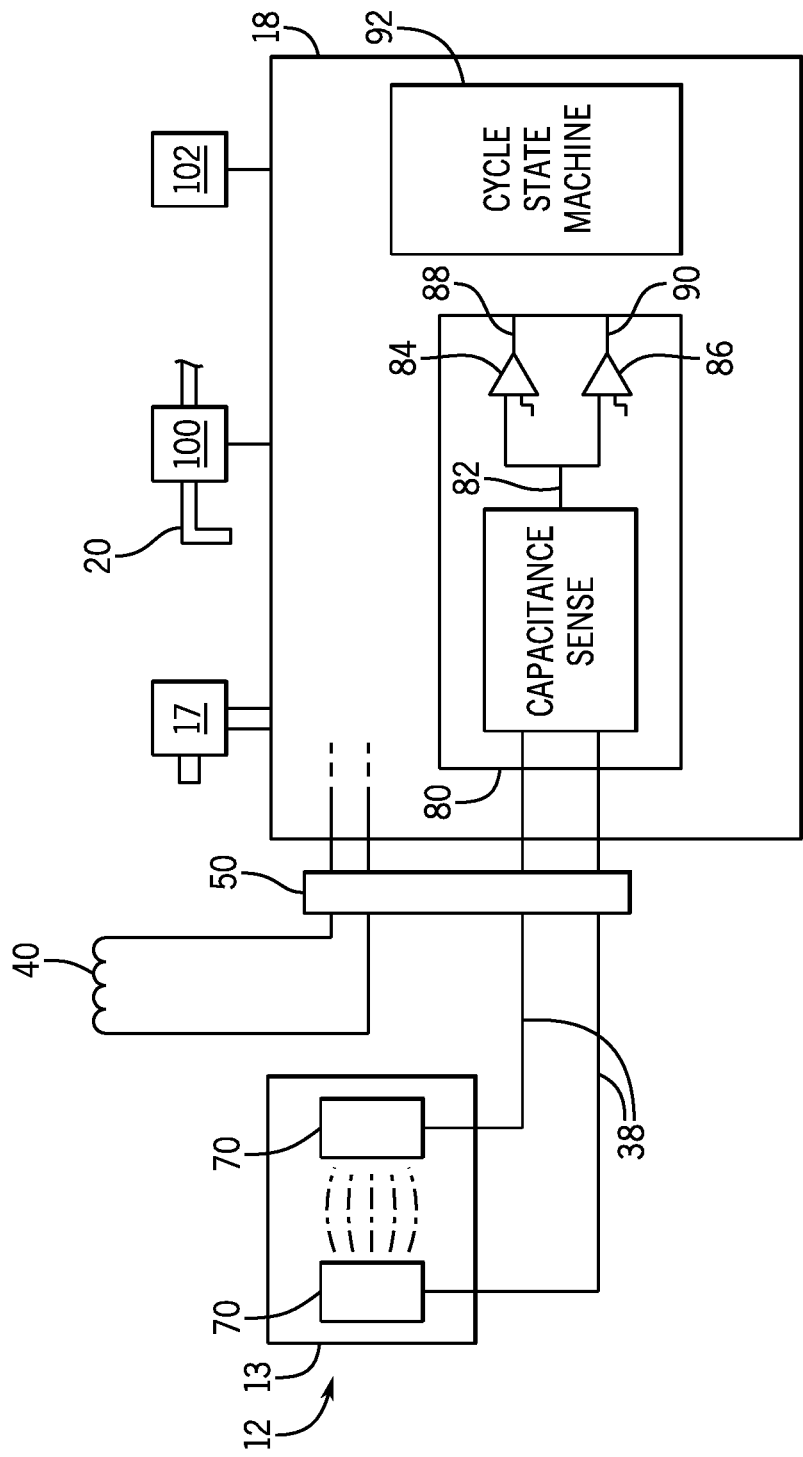
FIG. 10 is a schematic block diagram of a controller of the present application implementing a capacitive sensor for fill and ice ejection control.

Referring now to FIG. 10, generally the sensing electrodes 70 may communicate through slip rings 50 with the controller 18 as discussed above. The controller 18 implements a capacitive sensing circuit 80, for example, with dedicated circuitry and/or programming according to techniques well known in the art. For example, the capacitive sensing circuit 80 may incorporate the capacitance of the sensing electrodes 70 into a tuned or resonant circuit whose resonant frequency changes according to the capacitance and whose frequency may be measured, for example, by pulse counting. Alternatively, the capacitive sensing circuit 80 may operate using a charging system where the capacitance formed by the sensor electrodes 70 are charged and the time constant of that charging is measured through a timing circuit or the like.

The capacitive sensing circuit 80 may provide a capacitance output 82 that may be compared against a water level threshold by threshold comparator 84 and against the phase change comparator 86 as will be discussed in greater detail below, the comparator 84 providing a fill signal 88 and the comparator 86 providing a freezing signal 90, respectively.

The signals 88 and 90 may be used by a cycle state sequencer 92 that controls the filling, freezing, and ejection of ice from the ice tray 12 as will be discussed below. In this regard the controller 18 may also communicate with the motor 17 with a valve 100 communicating with the nozzle 20 for filling the ice tray 12, and with a user interface 102, for example, being a switch activatable by the user to turn the icemaker on and off, and with one or more heating elements 40 through slip rings 50 as will also be discussed below. This cycle state sequencer 92 may be implemented through discrete circuitry or through firmware programming of a microcontroller.

Referring now to FIGS. 1, 10, 11, and 13, the controller 18 implements the cycle state sequencer 92 as indicated at a first process block 106 (FIG. 13) to move ice tray 12 to the first upright position shown in FIG. 1. At this point, as indicated by process block 108, the capacitive sensing circuit 80 may be calibrated to the capacitance of the ice tray 12 when empty of water or ice and may adjust the threshold of the comparators 84 and 86 with respect to that calibrated value.

At succeeding process block 110, the controller 18 may fill the ice tray 12 through the nozzle 20. During this filling process, the capacitance measured by the capacitive sensing electrodes 70 may be monitored as indicated by decision block 112 to continue the filling process only as long as the capacitive sensing indicates that the ice mold pockets 13 are not fully filled with water.

Figure 11:
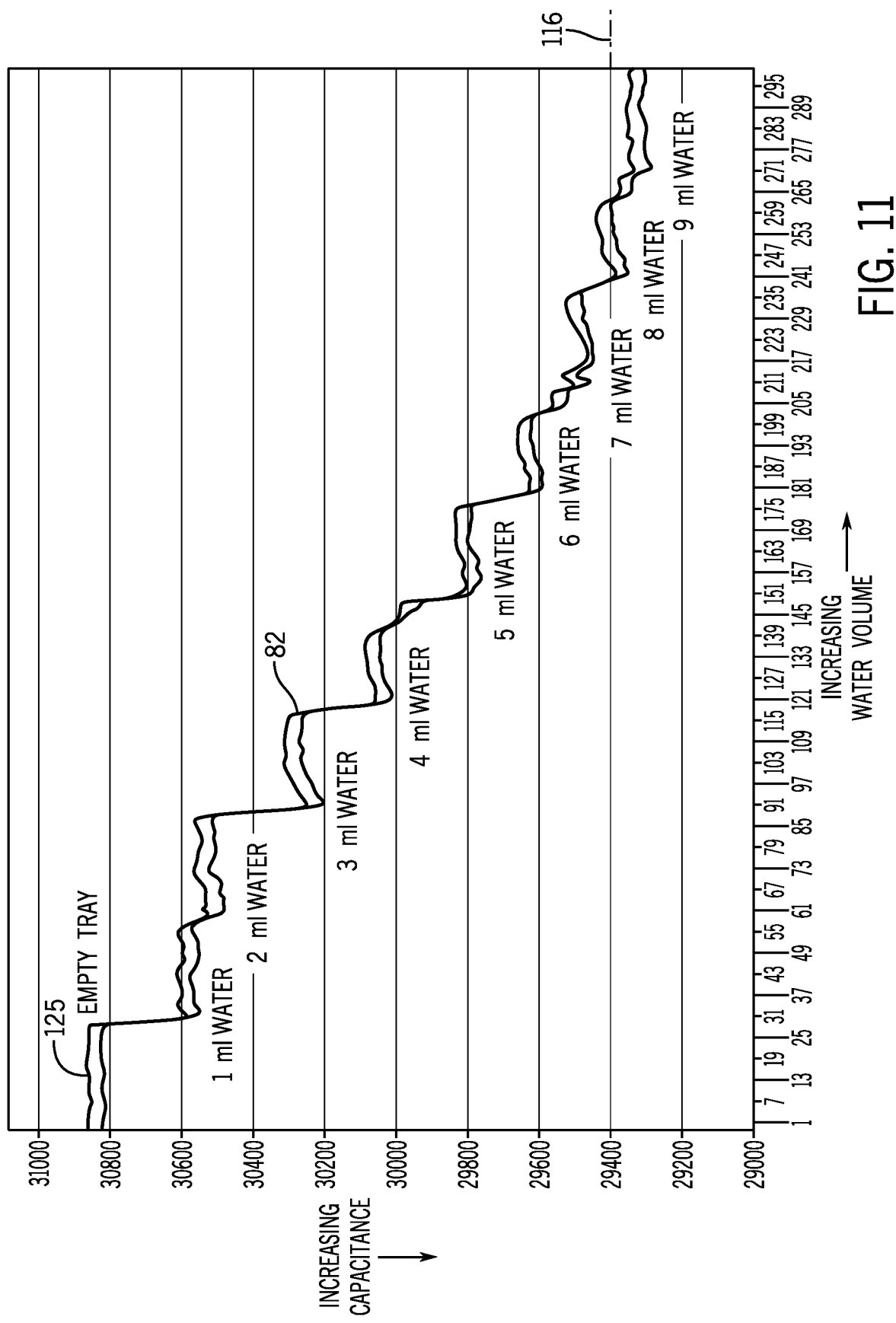
FIG. 11 is an experimentally obtained plot of capacitance as a function of water fill levels showing detection of water fill against a threshold.

In this regard, and referring also to FIG. 11, as the water level increases in the pockets 13, a volume of air dielectric within the pocket 13 is displaced by the higher dielectric of water increasing the capacitance output 82 from the calibration level 125. When the capacitance output 82 crosses a predetermined threshold 116, referenced with respect to the calibration step of process block 108, the decision block 112 indicates that the fill is complete and the valve 100 is closed. At this point as indicated by process block 118, a new calibration value 122 may be obtained with respect to the capacitance of the pocket 13 filled with water.

Figure 12:
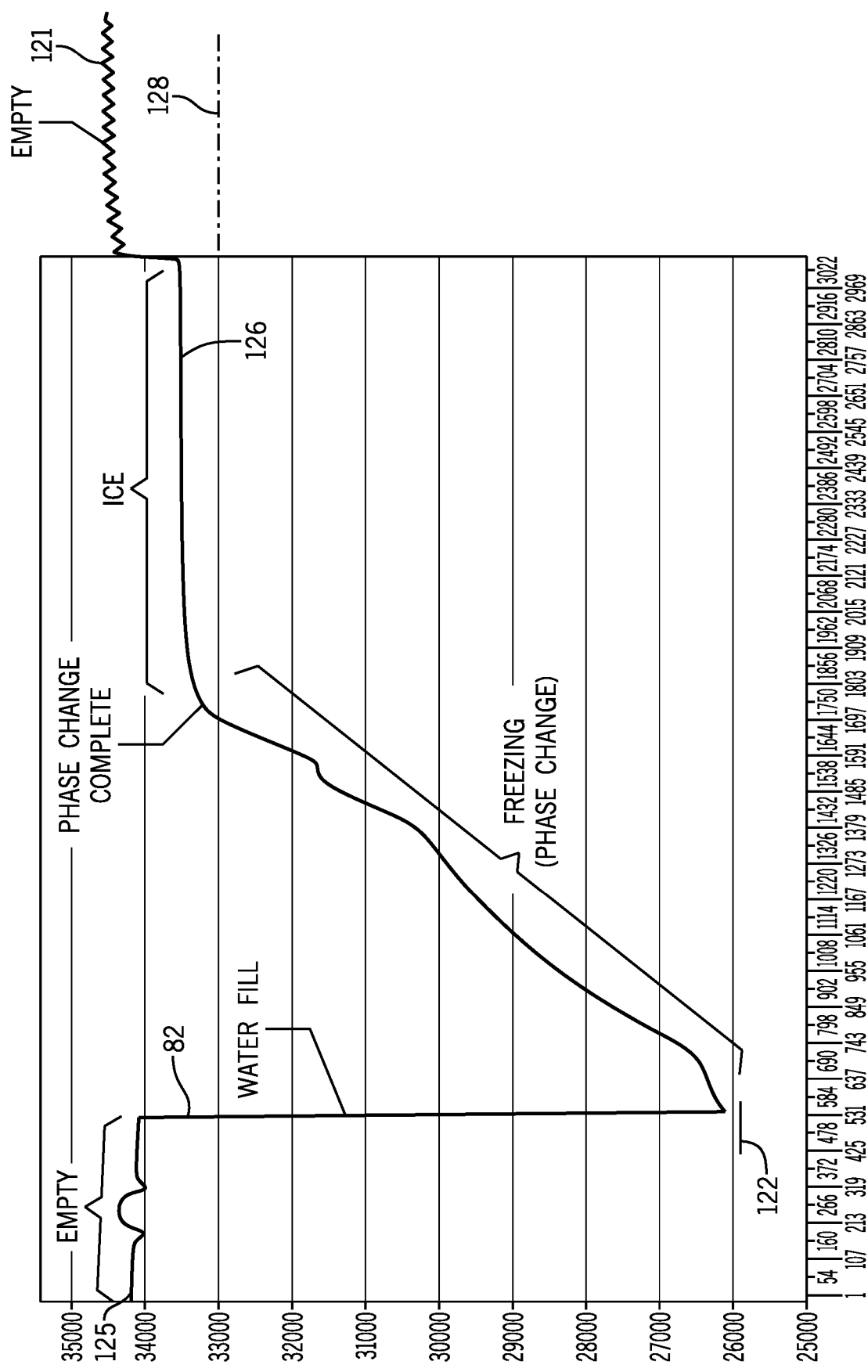
FIG. 12 is an experimentally obtained plot of capacitance versus phase change showing detection of freezing of the ice using a capacitive sensor.

Referring now to FIG. 12, as the water begins to freeze, the high dielectric water will be replaced with low dielectric ice causing the capacitance to change from calibration value 122 to ice capacitance value 126. Per decision block 119, this value may be detected either by a leveling off of the capacitance output 82 or against a threshold value 128 per the comparison of comparator 86 of FIG. 10.

Upon an indication that the ice (within each pocket 13 or a representative pocket 13) is fully frozen, at decision block 119, the state sequencer 92 may move immediately to eject the ice by inverting the ice tray 12 as indicated by process block 120 so as to maximize throughput of ice making. This detection of frozen ice immediately eliminates the need for the icemaker to allow a generous freezing time that accommodates a range of possible initial water temperature conditions and freezer temperature conditions that necessarily require additional time for a margin of error in a system based strictly on timing and/or indirect tray temperature.

After inverting the ice tray 12, or concurrent with that process, the heater elements 40 may be activated per process block 130. This activation may be for a predetermined time and may be accompanied by a slight optional flexing of the ice tray 12 as described above. Alternatively, the capacitive sensing electrodes 70 may be monitored to detect the change in capacitance from pockets 13 full of ice to pockets 13 empty of ice at level 121 indicating that sufficient heating has occurred as determined by decision block 132. By actively monitoring ejection of the ice, the amount of time that the heater elements 40 need to be activated can be minimized further improving energy efficiency. Immediately upon ejection of the ice cubes 14, as determined by decision block 132, a new ice cycle may be begun per process block 106, thereby maximizing ice throughput.

Figure 14:
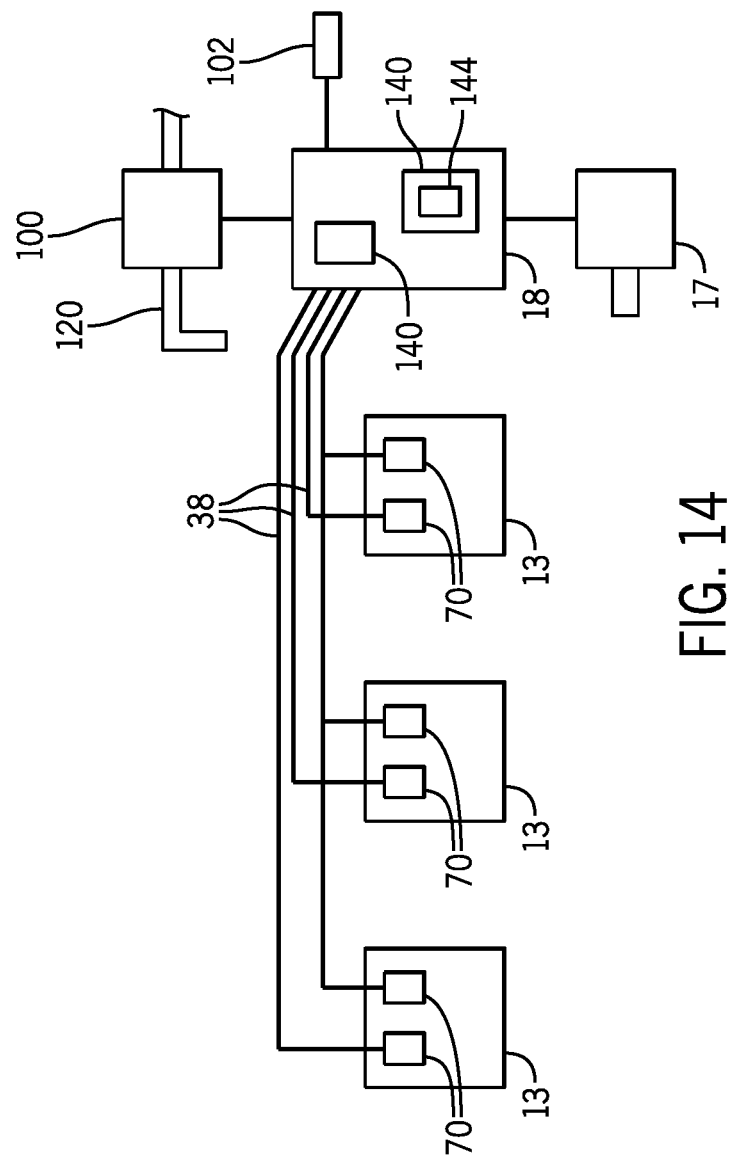
FIG. 14 is a block diagram of an embodiment of the invention providing individual sensing of each ice mold pocket.

Referring now to FIG. 14, in one embodiment, each pocket 13 rather than a single pocket 13 may have capacitive sensing electrodes 70 within that pocket 13 and may provide separate conductors of the conductor patterns 38 leading to the controller 18 so that the freezing of water in each pocket 13 and ejection of the ice cube from each pocket 13 may be independently determined for each pocket 13. Alternatively, a single representative pocket may be chosen. Generally, the controller 18 may include a processor 140 and a memory 142 holding a stored program 144 for communication with the motor 17, the valve 100, user interface 102, and the conductors of the conductive patterns 38 for capacitive sensors 70 and heater elements 40.

Figure 13:
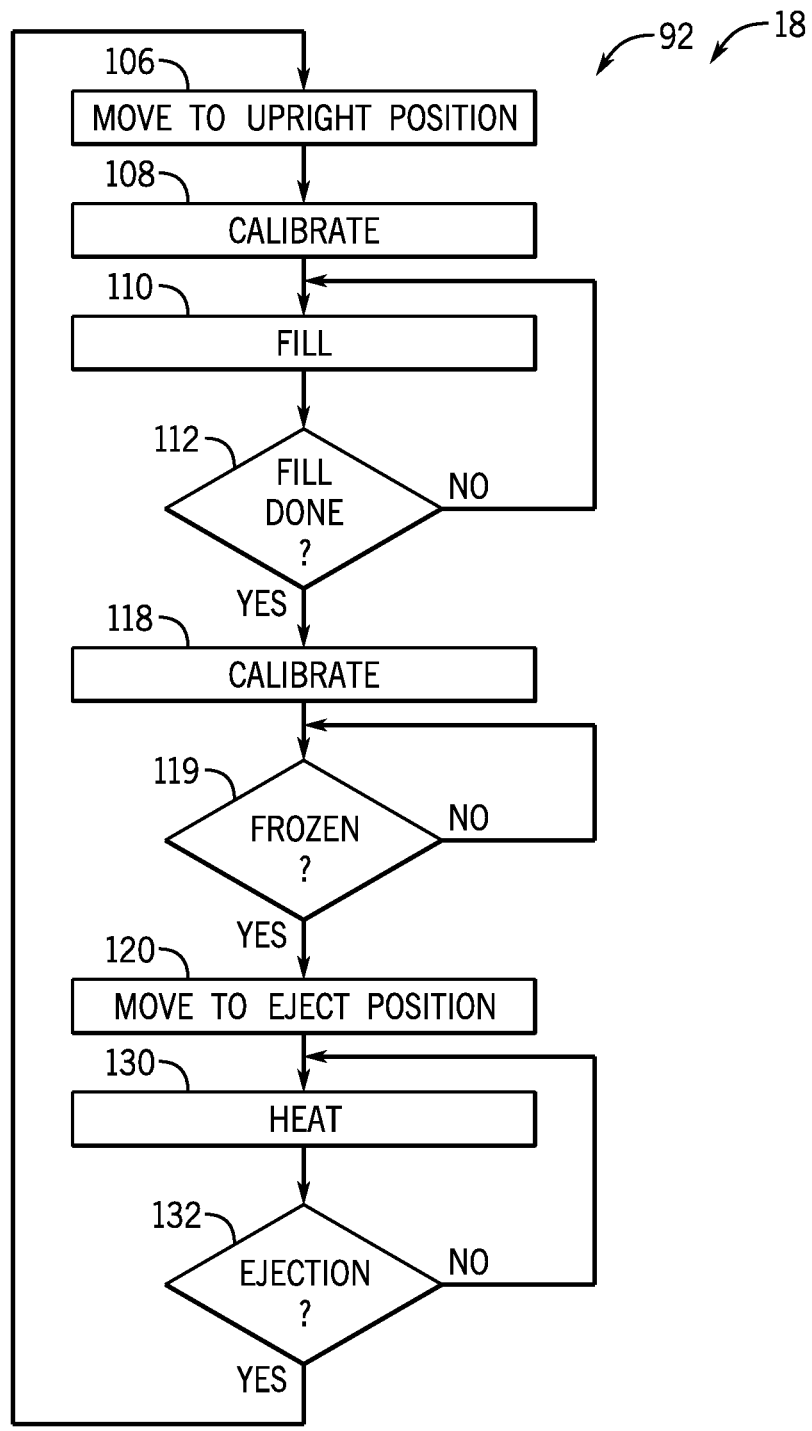
FIG. 13 is a flowchart of a program executed by the controller controlling the ice maker of FIG. 1.
Figure 15:
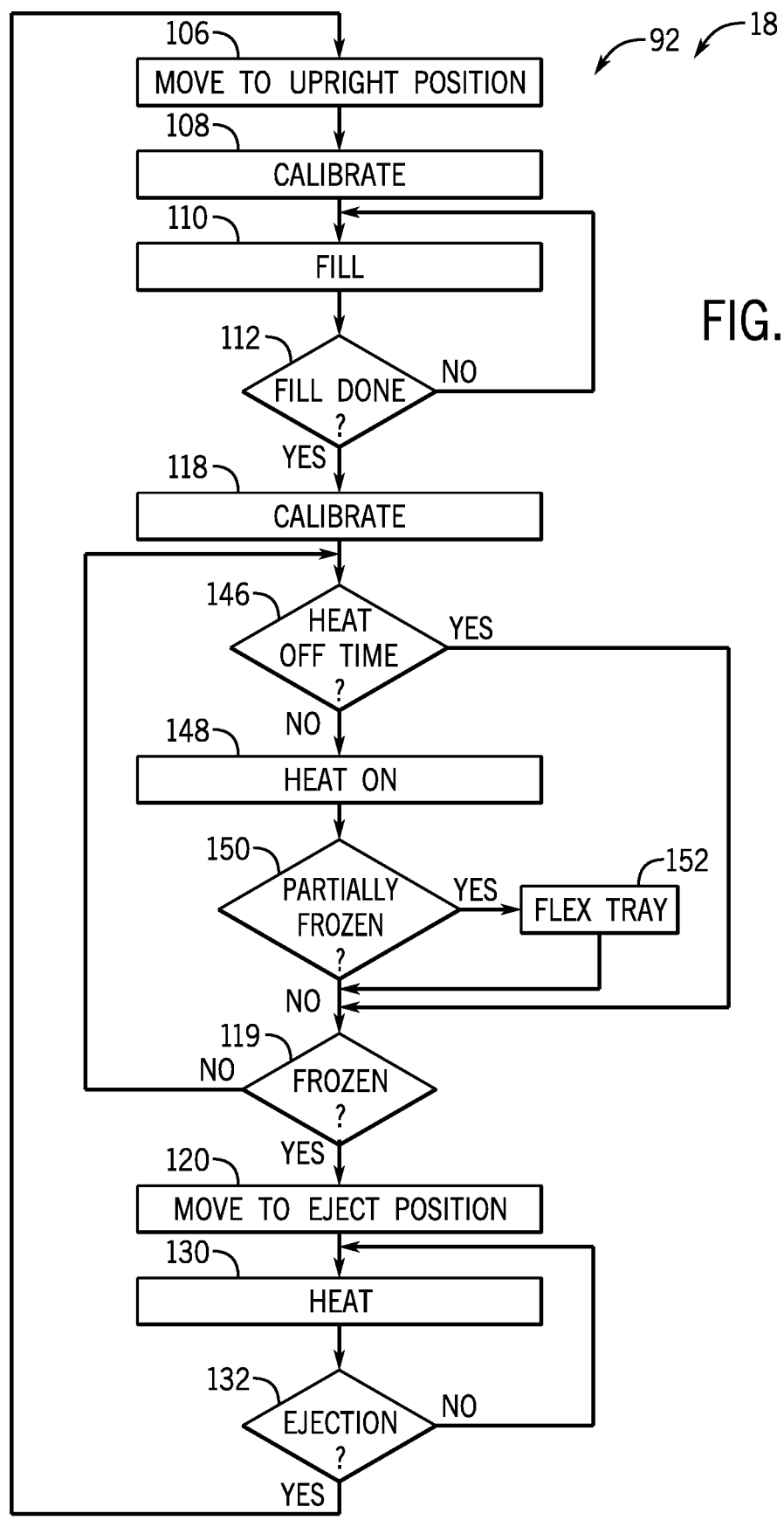
FIG. 15 is a variation of the flowchart of FIG. 13 with a program that heats an ice tray during freezing to promote ice clarity.

Referring now to FIG. 15, a modification of the flowchart of FIG. 13, provides for heating the ice mold during the freezing process to improve ice clarity. The clarity enhancement procedure is shown between the process block 118 and decision block 119. After calibration at process block 118, the water is allowed to initially rapidly cool without heating, during a first portion of the heat off time intended to accelerate the ice making process during temperature ranges that are not critical for improving ice clarity. The controller 18 determines an ending of the heat off time at decision block 146. This portion of the heat off time may be tracked by a timer communicating with the controller 18 and may last for a duration empirically determined to allow the water to cool to a sufficiently low temperature, which may be at or preferably slightly above the freezing point. Instead of elapsed time, ending the heat off time may be based on temperature. In this approach, the controller 18 may determine whether to end the heat off time based on a temperature value measured by a temperature sensor such as a thermistor or the like mounted to the ice tray 12 in thermal communication with the water of at least one pocket 13 or the determination may be based on sensed capacitive characteristics from electrodes 70 described above.

When the first portion of the heat off time ends at decision block 146, the ice tray 12 is heated at process block 148 with controller 18 (FIGS. 1, 10) further implementing the cycle state sequencer 92 (FIG. 10) to control the heater elements 40. The heating at process block 148 may be at a reduced heat output or low-level heating compared to that used for the ejection of ice cubes, for example, by use of a lower voltage or by duty cycle modulating electricity applied to the heating elements 40 by a solid-state switching element or the like. This reduced heat output slows but does not stop the freezing of the ice. Although the inventors do not wish to be bound by a particular theory, it is believed that this slower freezing of the ice can promote and outgassing of the water before the gas bubbles are trapped under an ice crust.

Still referring to FIG. 15, at decision block 150, controller 18 may optionally determine whether the water is partially frozen in the pockets 13 to the point of having a thin ice crust on top of the water in the pockets 13. Similar to determining an ending point for the heat off time at decision block 146, at decision block 150, controller 18 may evaluate whether the water is partially frozen based on a timer value(s) that was empirically determined to provide a partially frozen condition or based on sensed capacitive characteristics from electrodes 70. In one embodiment, if a partially frozen state is determined at decision block 150, then controller 18 commands a slight agitation of ice tray 12, such as flexing the tray at process block 152. The agitation or flexing at process block 152 may be a lesser version of rotation (without inverting or spilling water) and/or bowing of the ice tray 12 described with respect to FIG. 3. Although the agitation is slight, it is preferably enough to allow discrete air bubbles trapped under a thin frozen crust on top of the freezing water to coalesce into a single or fewer larger bubbles and escape from the pocket 13 through openings or separations at the interface between the ice crust and the heated sidewalls of the pocket 13 that are heated. While the inventors do not wish to be bound by a particular theory, it is believed that this top crust of ice preferentially forms because of the exposure of water directly to the refrigerated chamber of the freezer upwardly open pockets 13. In this regard, it may be important that the heater elements 40 are positioned on the sidewalls of the ice molds to release the ice crust from those walls, for example, during the heating procedure at process step 148 which may be further facilitated by the slight agitation or flexing the ice tray 12 at process step 152 to provide a mechanical separation force to assist the release.

At the conclusion of this flexing process of process block 152, the heater may be turned off beginning a second portion of the heat off time per decision block 146 as the ice clarity improving steps have been completed. Alternatively, if the flexing of process block 152 is not used, the heat may be turned off at a predetermined time interval or degree of freezing detected either by temperature or through the capacitive sensing described above. By turning off the heat, full freezing of the ice cubes is accelerated or energy is conserved.

Once the cubes have been determined to be fully frozen per decision block 119, the controller moves to steps 120-132 as have been previously described which may include reactivation of the heater 130, typically at a higher level, for ejection of the ice cubes.

Figure 16:
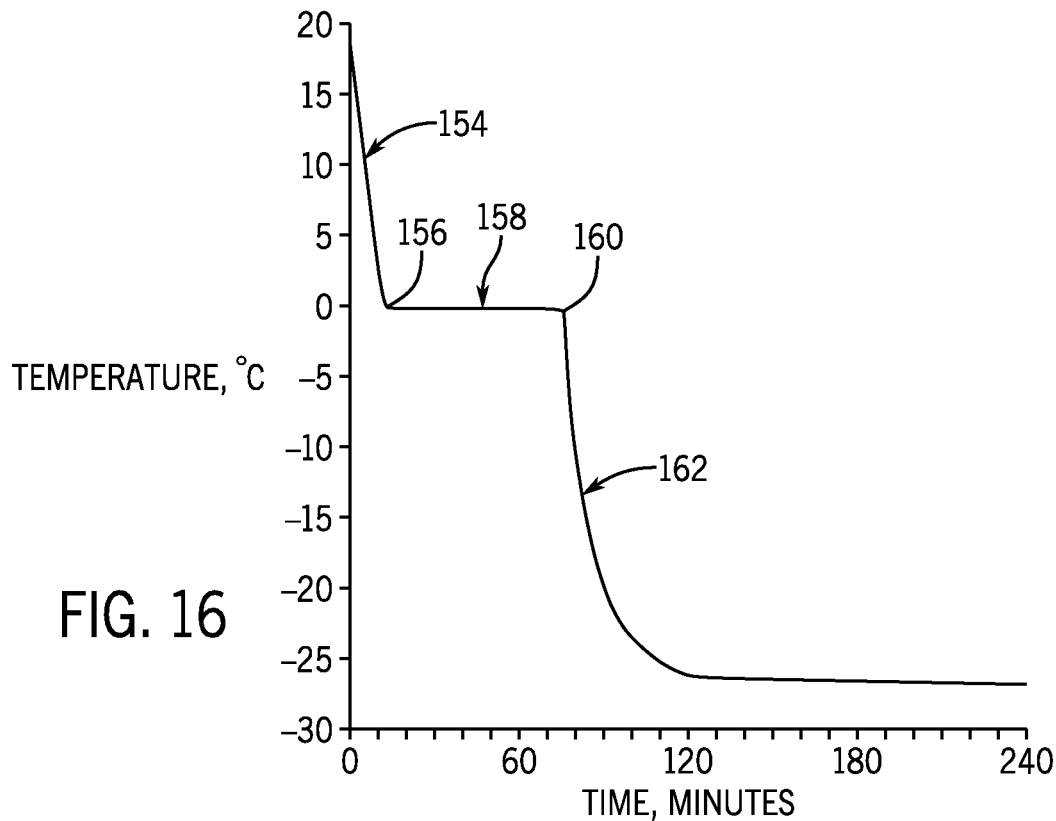
FIG. 16 is a plot of temperature as a function of time for a freezing procedure with without activation of the heating elements.

Referring now to FIG. 16, during a normal freezing of ice cubes without simultaneous heating to improve ice clarity, temperature of the water within the ice mold or ice tray 12 will drop rapidly as indicated by initial cooling section 154 until the phase change temperature of water and ice is reached at phase change initiation point 156. At this point temperature of the water will stabilize at 0° C. as indicated by phase change section 158 until the ice is fully frozen at full ice point 160. The frozen ice may then continue to cool as indicated by cooling ice section 162 to asymptotically reach the temperature of the freezer at about −25° C.

Figure 17:
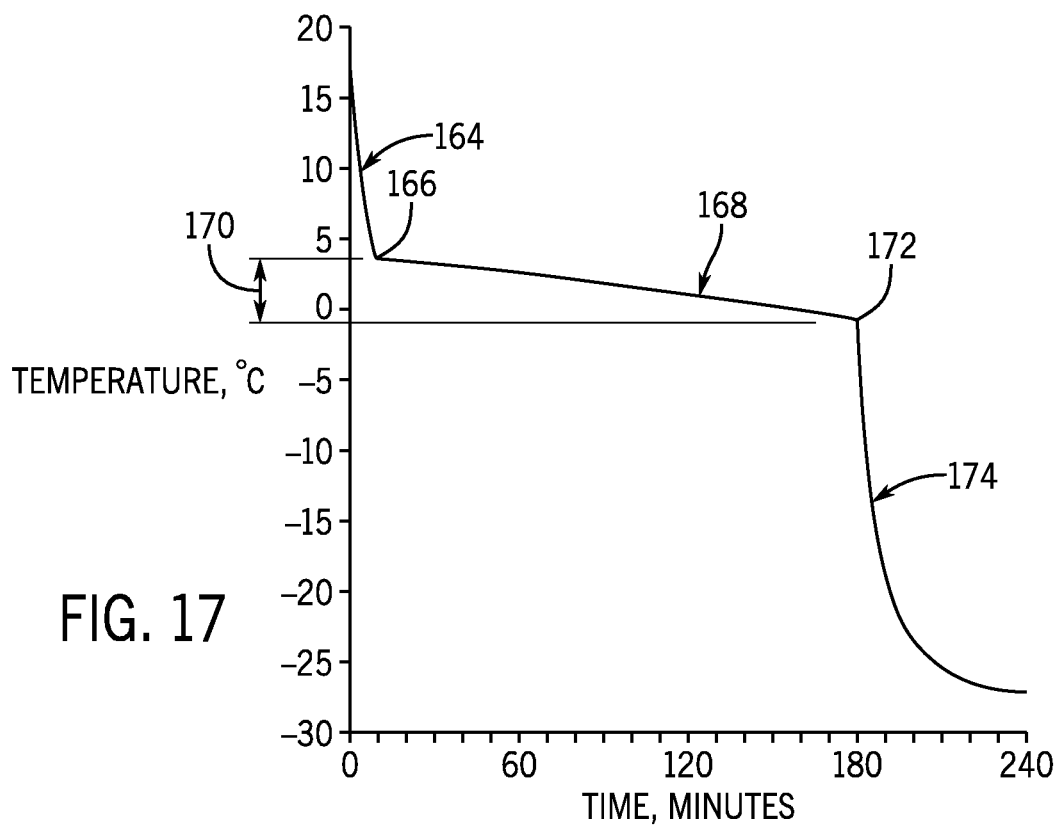
FIG. 17 is a plot of temperature as a function of time for a freezing procedure with activation of the heating elements to promote ice clarity.

Referring now to FIG. 17, in a first embodiment of the present invention, again the water in the ice tray 12 may cool rapidly as indicated by section 164 until a predetermined temperature, for example, 3° C., is reached as determined by the temperature sensing described above or comparable technique. At this point, the heater elements 40 are activated, represented by heat-on point 166, and maintained during a heat application section 168 at a low level empirically determined to prolong the time with which the water in the ice mold is maintained within a freezing band 170, for example, +3° C. to 0° C. In one embodiment, the heater elements are activated at an average power of 1.5 W, being less than the power used to release the ice during the ejection cycle. The amount of power may be set to prolong the freezing time (the time within the band 170 to an excess of 160 minutes). This slow freezing process has been empirically determined to promote clear ice.

Figure 18:
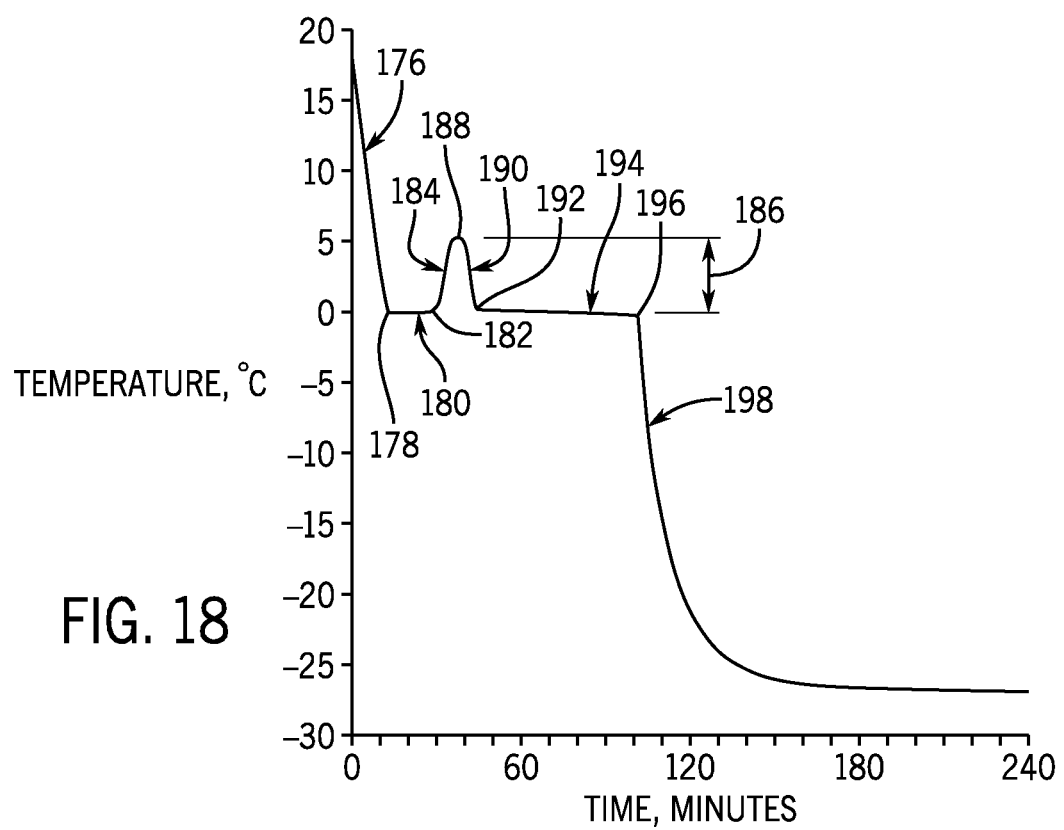
FIG. 18 is another plot of temperature as a function of time for a freezing procedure with activation of the heating elements to promote ice clarity.

Referring now to FIG. 18, another embodiment which may be combined with the first embodiment or used alone, the heater elements 40 may be activated prior to a full freezing of the ice cubes or before the time of full ice point 172 and a slight agitation of the ice tray made, along the lines described with respect to the tray flexing at process block 152 in FIG. 15. During the cooling ice section 174, the ice cools further to approach the temperature of the freezer.

In this embodiment, again the water in the ice tray 12 may cool rapidly as indicated by section 176. Similar to the unheated example shown in FIG. 16, the water cools until a phase change initiation point 178 at about 0° C. After a short period of time, shown as about 15 minutes in an initial phase change section 180, the heater elements 40 are activated, represented at heat-on point 182. This embodiment provides more heat than described in the embodiment of FIG. 17 and increases the temperature beyond that in the phase change section 180 during a heating section 184 within a heating band 186, for example, +5° C. to 0° C. The heating stops after a short period of time at heat-off point 188, providing a pulse-type high-intensity heating. Again without wishing to be bound by a particular theory, it is believed that this rapid and slight heating may facilitate release of a top crust of ice and allow trapped gas bubbles to escape to promote clear ice, which may further be accompanied by a slight agitation of ice tray 12. A second rapid cooling period at section 190 follows the heat-off point 188 and second phase change initiation point 192 starts a second temperature-stabilized period at about 0° C. at phase change section 194 until full ice point 196. Like in the above examples, this is followed by continued cooling of the ice as it approaches the temperature of the freezer at ice cooling section 198.

It will be appreciated that the timing of the heating 166 (FIG. 17) and 182 (FIG. 18) and the control of the heater element with respect to the time 168 (FIG. 17) and 184 (FIG. 18) may be informed by the temperature measurements described above and the sensing of the freezing state of the water described with respect to FIG. 12. Further, although the low-intensity generally continuous heating of FIG. 17 and high-intensity generally pulse-type heating of FIG. 18 were described separately, these approaches can be combined with each other. It is further understood that heating can continue longer than show, including heating for at least some time after the fully frozen point, if desired.

The present application hereby incorporates the following applications assigned to the assignee of the present invention and hereby incorporated in their entirety by reference:

The present application hereby incorporates the following applications assigned to the assignee of the present invention and hereby incorporated in their entirety by reference: U.S. patent application Ser. No. 13/288,443 entitled: "Ice-Harvest Drive Mechanism With Dual Position Bail Arm"; U.S. patent application Ser. No. 15/756,382 entitled: "Ice-Maker With Weight-Sensitive Ice Bin"; U.S. patent application Ser. No. 16/075,181 entitled: "Flexing Tray Ice-Maker with AC Drive"; and U.S. patent application Ser. No. 14/438,231 entitled: "Ice-Maker Motor With Integrated Encoder and Header"

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. An ice making apparatus comprising:
   an ice tray having multiple pockets of a thermoplastic material for molding water into ice cubes;
   a first and second electrode printed on at least one pocket for measuring a capacitance between the electrodes as influenced by a dielectric of material held within the pocket;
   an ejector arranged with respect to the ice tray to eject ice from the pockets after water in the pockets freezes into ice cubes; and
   a controller communicatively connected to the first and second electrode and the ejector to operate:
   (a) in a first state to allow filling of the multiple pockets of the ice tray with water;
   (b) in a second state after completion of the first state to monitor the first and second electrodes to detect a capacitance associated with a phase change of the water to ice; and
   (c) based on detection of the capacitance associated with the phase change of water to ice to activate the ejector to eject the ice cubes.

2. The apparatus of claim 1 wherein the electrodes are selected from the group consisting of: side-by-side parallel electrodes, interdigitated finger electrodes, or a first electrode partially or fully encircling a second electrode.

3. The apparatus of claim 1 wherein the electrodes are positioned adjacent to the water when the ice tray is filled with respect to a supporting structure of the ice tray.

4. The apparatus of claim 1 wherein the electrodes are printed in thick film ink.

5. The apparatus of claim 1 wherein the supporting structure of the ice tray is a thermoformed plastic sheet having a thickness less than 0.06 inches.

6. The apparatus of claim 1 wherein the ejector includes a heater positioned adjacent to at least one pocket and wherein the controller further operates to:
   (d) activate the heater of the ejector to eject ice cubes;
   (e) monitor the first and second electrodes to detect a capacitance associated with ejected ice from the pockets; and
   (f) in response to the detection of ejected ice, deactivate the heater.

7. The apparatus of claim 1 further including a valve arranged within a flow of water that selectively flows into the pockets;
   and wherein the controller communicates with the first and second electrode and the ejector to operate:
   (d) to open the valve to begin filling the pockets;
   (e) to monitor the first and second electrodes to detect a capacitance associated with a complete filling of the pockets;
   (f) based on detection of the capacitance associated with a complete filling of the pockets, to close the valve.

8. An ice making apparatus comprising:
   an ice tray having multiple pockets of a thermoplastic material for molding water into ice cubes;
   a first and second electrode printed on at least one pocket for measuring a capacitance between the electrodes as influenced by a dielectric of material held within the pocket and providing a corresponding a capacitive output value;
   a valve arranged within a flow of water that selectively flows into the pockets;
   an ejector arranged with respect to the ice tray to eject ice from the pockets after water in the pockets freezes into ice cubes; and
   a controller communicatively connected to the first and second electrode and including a capacitive sensing circuit, wherein the capacitive sensing circuit is configured to compare:
   the capacitive output value against a water level threshold value to determine a water fill level; and
   the capacitive output value against a phase threshold value to determine a phase state of the material held within the pocket;
   wherein the controller controls:
   the valve to permit of prevent the flow of water into the pockets based on the determined water fill level; and
   the ejector to permit or prevent the ejection of the ice cubes from the pockets based on the determined phase state.

9. The apparatus of claim 8, wherein the first and second electrodes are:
   provided at a common height within the pocket; and
   transversely spaced with respect to each other within the pocket.

10. The apparatus of claim 9, wherein each of the pockets is defined by interconnected walls and the apparatus further comprises:
    heater elements provided at multiple ones of the interconnected walls of each of the pockets.

11. The apparatus of claim 10, wherein first and second electrodes and the heater elements are provided at different ones of the interconnected walls of each of the respective pocket.

* * * * *